United States Patent
Morone (10) Patent No.: US 11,913,855 B2
(45) Date of Patent: Feb. 27, 2024

(54) MULTI-LAYER HOSE WITH TRACER MATERIAL

(71) Applicant: Caterpillar Inc., Peoria, IL (US)

(72) Inventor: Stefano Morone, Edwards, IL (US)

(73) Assignee: Caterpillar Inc., Peoria, IL (US)

(*) Notice: Subject to any disclaimer, the term of this patent is extended or adjusted under 35 U.S.C. 154(b) by 337 days.

(21) Appl. No.: 17/303,637

(22) Filed: Jun. 3, 2021

(65) Prior Publication Data

US 2022/0390315 A1    Dec. 8, 2022

(51) Int. Cl.
*G01M 3/22*    (2006.01)
*F15B 20/00*    (2006.01)
*F16L 11/04*    (2006.01)

(52) U.S. Cl.
CPC ........... *G01M 3/222* (2013.01); *F15B 20/005* (2013.01); *F16L 11/04* (2013.01); *F16L 2201/30* (2013.01)

(58) Field of Classification Search
CPC ................. G01M 3/20–205; G01M 3/222
See application file for complete search history.

(56) References Cited

U.S. PATENT DOCUMENTS

| | | | | |
|---|---|---|---|---|
| 4,735,083 A | * | 4/1988 | Tenenbaum | F01P 11/14 73/40.5 R |
| 4,922,748 A | * | 5/1990 | Hopenfeld | G01M 3/22 250/303 |
| 5,228,478 A | * | 7/1993 | Kleisle | B65G 53/523 138/104 |
| 5,622,210 A | | 4/1997 | Crisman et al. | |
| 7,197,914 B2 | | 4/2007 | Maresca, Jr. et al. | |
| 7,631,666 B1 | * | 12/2009 | Ng | F16L 11/081 138/104 |
| 8,322,414 B2 | | 12/2012 | Al-Gouhi et al. | |
| 10,060,570 B2 | | 8/2018 | Kersey et al. | |
| 2003/0118440 A1 | * | 6/2003 | Zhao | C23C 30/00 415/118 |
| 2009/0162632 A1 | * | 6/2009 | Kirby | C04B 41/5024 428/448 |
| 2013/0167618 A1 | | 7/2013 | Grosse Bley | |
| 2015/0345688 A1 | * | 12/2015 | Kersey | B65G 53/523 427/230 |
| 2016/0123503 A1 | | 5/2016 | Clements | |
| 2019/0353550 A1 | | 11/2019 | Park et al. | |

FOREIGN PATENT DOCUMENTS

| | | |
|---|---|---|
| CN | 112460344 | 3/2021 |
| WO | 2018093272 | 5/2018 |
| WO | 2021058966 | 4/2021 |

\* cited by examiner

*Primary Examiner* — Alexander A Mercado (57) ABSTRACT

A system may include a hose assembly; a sensor device; and a controller. The hose assembly may be configured to be connected to a hydraulic circuit of a machine. A first layer, of a hose of the hose assembly, may be configured to transport a hydraulic fluid. A second layer, of the hose, may comprise a tracer material that is configured to be released into the hydraulic fluid when the first layer is experiencing a failure. The sensor device may be configured to detect the tracer material in the hydraulic fluid, and generate sensor data indicating that the tracer material has been detected. The controller may be configured to determine that the hose assembly is experiencing the failure based on the sensor data and cause an action to be performed based on determining that the hose assembly is experiencing the failure.

18 Claims, 4 Drawing Sheets

MULTI-LAYER HOSE WITH TRACER MATERIAL

TECHNICAL FIELD

The present disclosure relates generally to a hose assembly and, for example, to a multi-layer hose with a tracer material.

BACKGROUND

A work machine may include one or more hydraulic circuits. A hydraulic circuit may include a valve, a pump, and a plurality of hose assemblies that supply a hydraulic fluid to actuate a hydraulic cylinder assembly. In some instances, the hydraulic cylinder assembly may be connected to an implement and may cause movement of the implement. A hose, of a hose assembly, may include multiple layers. An inner layer, of the multiple layers, may be configured to convey the hydraulic fluid.

In some instances, the inner layer may experience a failure. For example, the inner layer may experience a tear, a puncture, among other examples. When the inner layer experiences such a failure, the hydraulic fluid may leak through the tear (or puncture) to one or more other layers of the multiple layers of the hose. Over a period of time, the leaked hydraulic fluid may cause damage to the hose assembly, the hydraulic circuit, and/or other components of the work machine. Such damage may cause the work machine to perform in an unintended manner and/or cause the work machine to experience a failure.

U.S. Pat. No. 10,060,570 (the '570 patent) discloses techniques for monitoring wear in a liner of a pipe using a chemical taggant of tracer that may be detected to determine an indication about a degree of liner or coating wear or a location of wear in the pipe. While the '570 patent discloses monitoring wear of a liner of a pipe, the '570 patent does not address detecting a leak of a hydraulic fluid into layers of a hose assembly for a hydraulic circuit (of a work machine), let alone detecting the leak to prevent damage (e.g., damage to the hydraulic circuit and/or damage to the working machine).

The multi-layer hose and system of the present disclosure solve one or more of the problems set forth above and/or other problems in the art.

SUMMARY

In some implementations, a system includes a hose assembly configured to be connected to a hydraulic circuit of a machine, wherein a first layer, of a hose of the hose assembly, is configured to transport a hydraulic fluid, wherein a second layer, of the hose, comprises a tracer material that is configured to be released into the hydraulic fluid when the first layer is experiencing a failure; a sensor device configured to: detect the tracer material in the hydraulic fluid, and generate sensor data indicating that the tracer material has been detected; and a controller configured to: determine that the hose assembly is experiencing the failure based on the sensor data; and cause an action to be performed based on determining that the hose assembly is experiencing the failure.

In some implementations, a hose assembly includes a hose comprising: an outer layer, a first intermediate layer adjacent to the outer layer, a second intermediate layer adjacent to the first intermediate layer, and an inner layer adjacent to the second intermediate layer, wherein the inner layer is configured to transport a hydraulic fluid of a hydraulic circuit of a machine, wherein the second intermediate layer comprises a tracer material, wherein the tracer material is configured to be released into the hydraulic fluid when a portion of the inner layer experiences a failure.

In some implementations, a hose assembly comprising a hose comprising: a first layer configured to transport a fluid; and a second layer comprising a tracer material that is configured to be released into the fluid when the first layer is experiencing a failure.

DETAILED DESCRIPTION

The present disclosure relates to a hose comprising an outer layer, a first intermediate layer adjacent to the outer layer, a second intermediate layer adjacent to the first intermediate layer, and an inner layer adjacent to the second intermediate layer. The inner layer may be configured to transport a hydraulic fluid of a hydraulic circuit of a machine. The second intermediate layer may comprise a tracer material. The tracer material may comprise a metal such as cerium, yttrium, lanthanum, scandium, and/or zirconium. The tracer material may be configured to be released into the hydraulic fluid when a portion of the inner layer experiences a failure, such as a perforation in the inner layer that may enable the hydraulic fluid to leak to other layers of the hose and to damage the hose.

The hose assembly may be included in a system that includes a sensor device and a controller. The sensor device may be configured to detect the tracer material in the hydraulic fluid, and generate sensor data indicating that the tracer material has been detected. The controller may be configured to determine that the hose is experiencing the failure based on the sensor data and cause an action to be performed based on determining that the hose is experiencing the failure.

For example, based on determining that the hose is experiencing the failure, the controller may provide a notification (e.g., including information identifying the hose and/or information identifying the hydraulic circuit) and/or may cause a supply of the hydraulic fluid, to the hydraulic circuit, to be terminated. The notification may be provided to a device of an operator of the machine, to a device of a technician, among other examples. In this regard, the notification may be provided to cause the hose assembly to be repaired and/or replaced by the operator of the machine, by the technician, among other examples.

In this regard, the tracer material and the system may enable the failure of the hose to be detected and may enable an appropriate action to be performed in a manner that prevents the hydraulic fluid from leaking to one or more other layers of the hose and from causing damage. Accordingly, the system of the present disclosure may prevent damage to the hydraulic circuit and/or to the machine.

The term "machine" may refer to a machine that performs an operation associated with an industry such as, for example, mining, construction, farming, transportation, or another industry. Moreover, one or more implements may be connected to the machine. As an example, a machine may include a construction vehicle, a work vehicle, or a similar vehicle associated with the industries described above.

Figure 1:
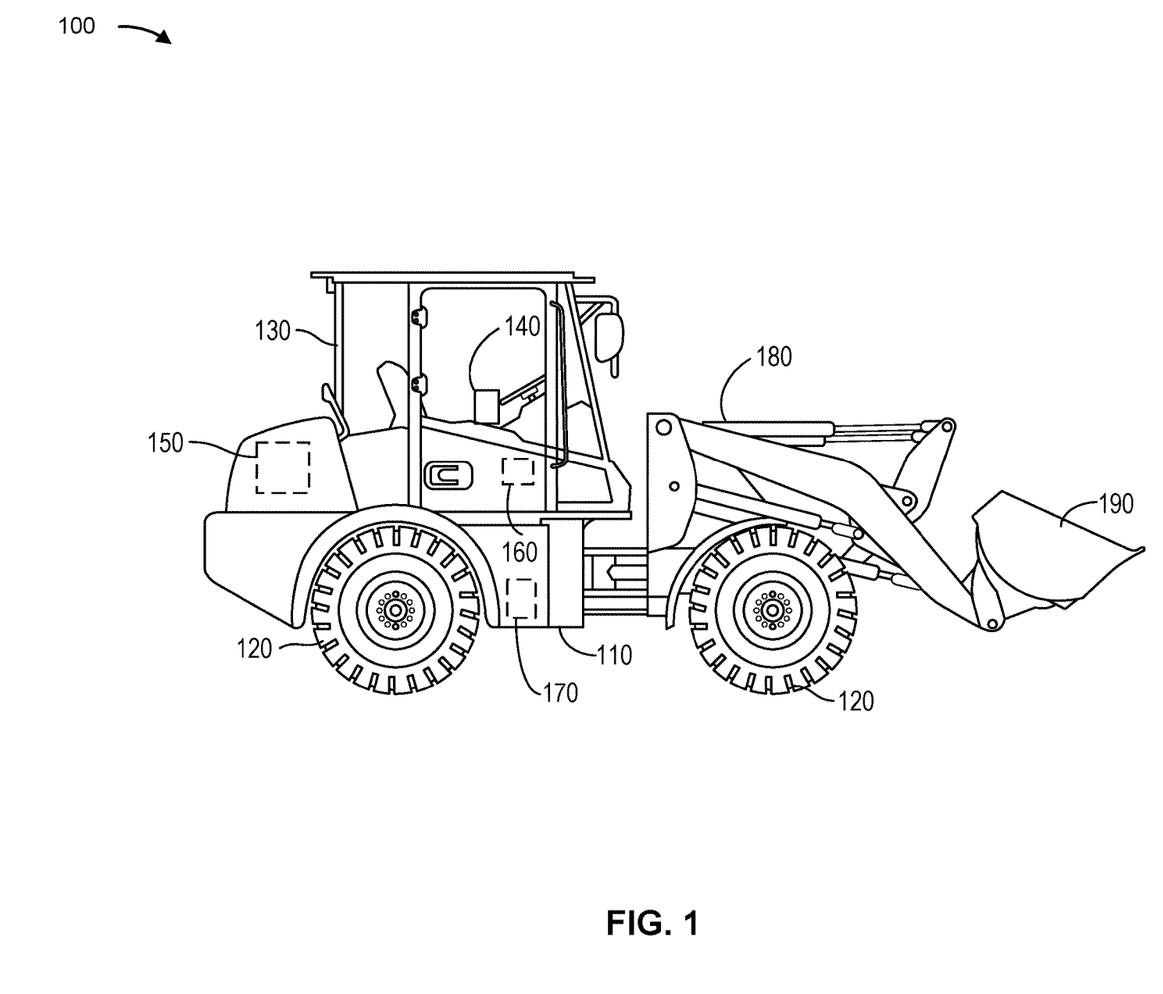
FIG. 1 is a diagram of an example machine described herein.

FIG. 1 is a diagram of an example machine 100 described herein. As shown in FIG. 1, machine 100 may be a wheel loader. Alternatively, machine 100 may be a track type tractor, a motor grader, a dozer, an excavator, among other examples. As shown in FIG. 1, machine 100 includes a frame 110, ground engaging elements 120, an operator cab 130, operator controls 140, an engine 150, a controller 160, a hydraulic circuit 170, hydraulic cylinder assemblies 180, and an implement 190. Ground engaging elements 120 may include wheels, tracks, among other examples, for propelling machine 100. As shown in FIG. 1, ground engaging elements 120 are mounted on frame 110 and driven by engine 150 and one or more drivetrains (not shown).

As shown in FIG. 1, operator cab 130 is mounted on frame 110 and is configured to support an operator of machine 100. Operator cab 130 may include an integrated display (not shown) and operator controls 140, such as, for example, an integrated joystick. Operator controls 140 may include one or more input components and a user interface that enable the operator to control an operation of machine 100. Engine 150 may include a diesel engine, a gasoline engine, a natural gas engine, a hybrid engine, an electric motor, and/or another power source configured to drive ground engaging elements 120.

Controller 160 (e.g., an electronic control module (ECM)) may control and/or monitor operations of machine 100. For example, controller 160 may control and/or monitor the operations of machine 100 based on signals from the integrated display, signals from operator controls 140, and/or signals from hydraulic circuit 170. For instance, controller 160 may determine that a hose assembly, of hydraulic circuit 170, is experiencing a failure and may cause an action to be performed based on determining that the hose assembly is experiencing the failure, as described in more detail below.

Hydraulic circuit 170 may be mounted to frame 110. Hydraulic circuit 170 may be configured to supply hydraulic fluid to hydraulic cylinder assemblies 180 to cause implement 190 to be articulated (e.g., to cause a movement of implement 190). A hydraulic cylinder assembly 180 may include a hydraulic cylinder and a hydraulic rod. The hydraulic fluid may cause the hydraulic cylinder to be actuated to cause the hydraulic rod to extend out of the hydraulic cylinder and to retract into the hydraulic cylinder, thereby causing implement 190 to be articulated.

As shown in FIG. 1, implement 190 is mounted at a distal end of lifting arms and may be articulated relative to the lifting arms by hydraulic cylinder assemblies 180, electric motors, and/or other electro-mechanical components. Implement 190 may be a bucket (as shown in FIG. 1) or another type of tool or implement that may be mounted the distal end of lifting arms.

As indicated above, FIG. 1 is provided as an example. Other examples may differ from what was described in connection with FIG. 1.

Figure 2:
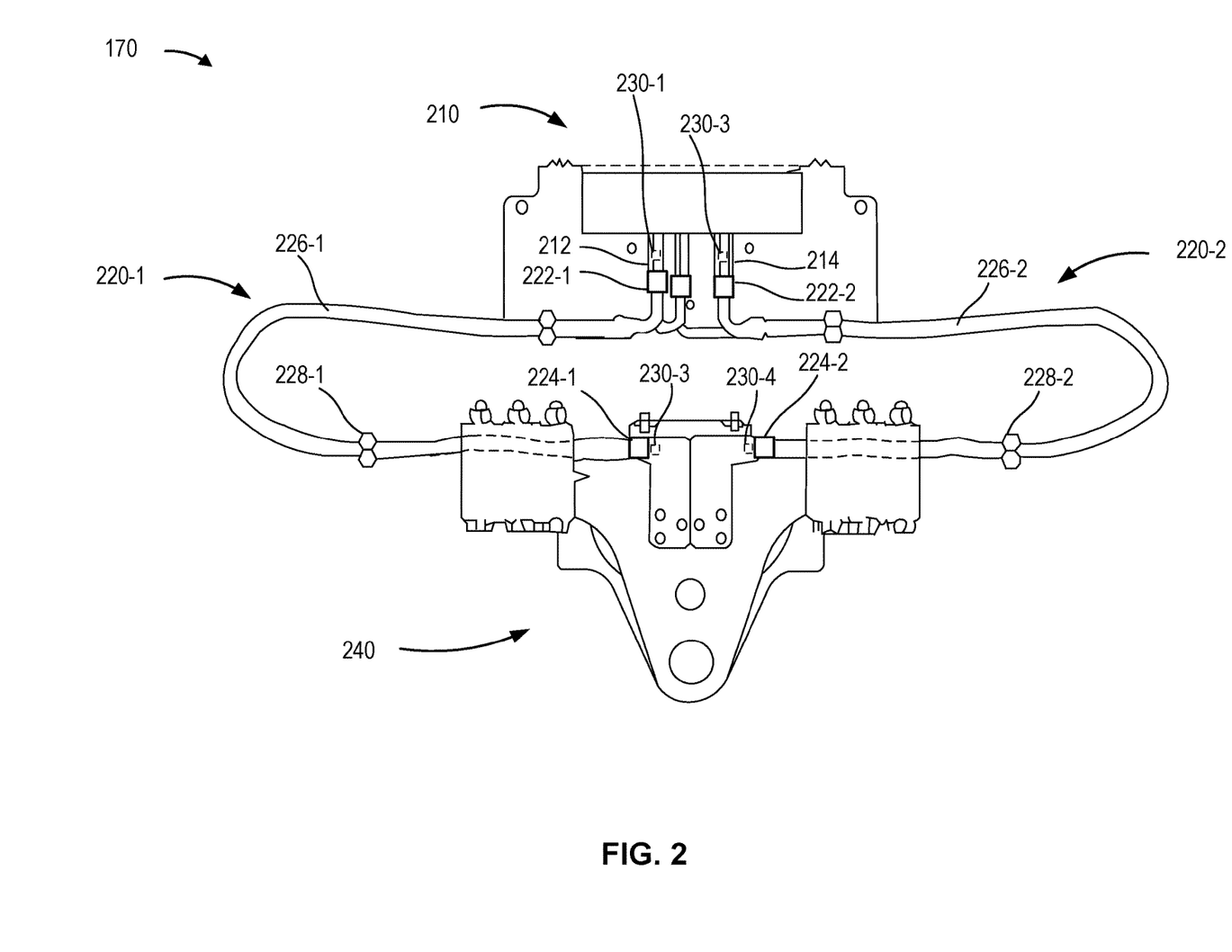
FIG. 2 is a diagram of an example hydraulic circuit described herein.

FIG. 2 is a diagram of an example hydraulic circuit 170 described herein. As shown in FIG. 2, hydraulic circuit 170 includes a valve assembly 210, a plurality of hose assemblies 220 (referred to herein individually as "hose assembly 220," and collectively referred to as "hose assemblies 220"), and a plurality of sensor devices 230 (referred to herein individually as "sensor device 230," and collectively referred to as "sensor devices 230"). In some examples, hydraulic circuit 170 may include a hydraulic pump (not shown) and a hydraulic fluid reservoir (not shown). Hydraulic circuit 170 may be connected to a mounting assembly 240 that is configured to be mounted to frame 110 of machine 100.

Valve assembly 210 may include one or more devices that are configured to control a flow of a hydraulic fluid in hydraulic circuit 170. For example, valve assembly 210 may control an inflow of the hydraulic fluid into hydraulic circuit 170 and control an outflow of the hydraulic fluid out of hydraulic circuit 170. As shown in FIG. 2, valve assembly 210 may include an inlet valve 212 and an outlet valve 214. Inlet valve 212 may be configured to control the inflow of the hydraulic circuit 170. For example, inlet valve 212 may be configured to enable the hydraulic fluid to be provided, via a hose assembly 220 (e.g., hose assembly 220-1), from one or more components (external with respect to hydraulic circuit 170) to hydraulic cylinder assemblies 180. Outlet valve 214 may be configured to control the outflow of the hydraulic fluid out of hydraulic circuit 170. For example, outlet valve 214 may be configured to provide, via another hose assembly 220 (e.g., hose assembly 220-2), the hydraulic fluid from hydraulic cylinder assemblies 180 to the one or more components external with respect to hydraulic circuit 170.

Hose assembly 220 may include a first coupling interface 222, a second coupling interface 224, a hose 226, and a hose guard 228. First coupling interface 222 may be configured to connect to inlet valve 212. Second coupling interface 224 may be configured to connect to hydraulic cylinder assembly 180 via mounting assembly 240. Hose 226 may be configured to transport the hydraulic fluid (e.g., between inlet valve 212 and hydraulic cylinder assembly 180 or between hydraulic cylinder assembly 180 and outlet valve 214). Hose 226 may be a multi-layer hose, as explained in more detail below in connection with FIG. 3. Hose guard 228 may be configured to protect an outer layer of hose 226 from wear that may result from the outer layer contacting another component of machine 100 (e.g., protect from friction induced wear, rubbing induced wear, among other examples). Hose guard 228 may include a metal material, a plastic material, among other examples.

Sensor device 230 may include one or more devices configured to determine a measure of quality of the hydraulic fluid and generate sensor data indicating the measure of quality of the hydraulic fluid. For example, sensor device 230 may detect a tracer material (e.g., a metal) in the hydraulic fluid and the sensor data (generated by sensor device 230) may indicate that the tracer material has been detected. For instance, the sensor data may include information identifying a concentration of the tracer material in the hydraulic fluid. In some examples, sensor device 230 may be configured to detect the tracer material using inductively coupled plasma atomic emission spectroscopy (or inductively coupled plasma optical emission spectrometry). Sensor device 230 may be associated with a respective hose assembly 220. For example, sensor device 230 may be provided adjacent to first coupling 222 or second coupling 224 of the respective hose assembly 220. In this regard, the sensor data may further include information identifying the respective hose assembly 220 and/or information identifying hydraulic circuit 170 and/or information identifying a group of components (of machine 100) that are associated with hydraulic circuit 170.

In some examples, sensor device 230 may provide the sensor data to controller 160 to enable controller 160 to determine whether the respective hose assembly 220 is experiencing a failure (e.g., a perforation of an inner layer of hose 226 that may enable the hydraulic fluid to leak to another layer of hose 226). For instance, controller 160 may determine that the inner layer of hose 226 has been perforated (or ruptured or torn) when the concentration of the tracer material satisfies a concentration threshold. In some situations, controller 160 may be pre-configured with information identifying the concentration threshold. Additionally, or alternatively, controller 160 may receive the information identifying the concentration threshold from operator controls 140, from a device of the operator, from a back office system, among other examples.

Based on determining that the respective hose assembly 220 is experiencing the failure (e.g., based on determining that the inner layer of hose 226 has been perforated), controller 160 may cause an action to be performed. For example, based on determining that the respective hose assembly 220 is experiencing the failure, controller 160 may provide a notification (e.g., to a device of the operator, to a back office system, to a device of a technician, to an autonomous device, among other examples). For instance, controller 160 may provide information identifying hose assembly 220, may provide information identifying hydraulic circuit 170, may provide information identifying a location of machine 100 (e.g., to the device of the technician and/or to the autonomous device), among other examples.

The notification may be provided to cause the respective hose assembly 220 to be repaired and/or replaced by the operator of the machine, by the technician, by the autonomous device, among other examples. With respect to the autonomous device for example, controller 145 may provide the notification to cause the autonomous device to navigate to the location of machine 100, to identify, and to service, repair, and/or replace the respective hose assembly 220. Additionally, or alternatively, to providing the notification, controller 160 may cause a supply of the hydraulic fluid, to hydraulic circuit 170, to be terminated.

In some instances, controller 160 may determine a severity of the failure based on the concentration of the tracer material. For example, controller 160 may determine that the severity of the failure is a first severity when the concentration of the tracer material satisfies a first concentration threshold; determine that the severity of the failure is a second severity when the concentration of the tracer material satisfies a second concentration threshold; and so on. The second severity may exceed the first severity and the second concentration threshold may exceed the first concentration threshold.

Controller 160 may perform a first action when the severity of the failure is the first severity. For example, the first action may include providing the information identifying hose assembly 220, providing the information identifying hydraulic circuit 170, providing the information identifying the location of machine 100 and/or providing information identifying the first severity. Controller 160 may perform a second action when the severity of the failure is the second severity. For example, the second action may include causing a supply of the hydraulic fluid (to hydraulic circuit 170) to be terminated, providing the information identifying hose assembly 220, providing the information identifying hydraulic circuit 170, providing information identifying the location of machine 100, and/or providing information identifying the second severity.

Sensor device 230 may provide the sensor data to controller 160 periodically (e.g., every five seconds, every ten seconds, every thirty seconds, among other examples). Additionally, or alternatively, sensor device 230 may provide the sensor data to controller 160 based on a trigger (e.g., based on a request from controller 160, based on the concentration of the tracer material satisfying one or more of the concentration thresholds discussed above, among other examples). In some implementations, controller 160 may adjust a rate at which sensor device 230 provides the sensor data to controller 160 based on a concentration of the tracer material. For example, controller 160 may cause sensor device 230 to increase a rate at which sensor device 230 provides the sensor data when controller 160 determines that the tracer material has been detected in the hydraulic fluid and that the concentration of the tracer material does not satisfy a third concentration threshold. The first concentration threshold may exceed the third concentration threshold. Alternatively, controller 160 may cause sensor device 230 to decrease the rate at which sensor device 230 provides the sensor data when controller 160 determines that the tracer material has not been detected in the hydraulic fluid.

As shown in FIG. 2, sensor devices 230 may be provided at different portions of hydraulic circuit 170. For example, sensor devices 230 may be provided adjacent to first coupling interfaces 222 and second coupling interfaces 224 of hose assemblies 220. For instance, a first sensor device 230-1 may be located adjacent to first coupling 222-1 of hose assembly 220-1 (e.g., may be located inside inlet valve 212). A second sensor device 230-2 may be located adjacent to second coupling 224-1 of hose assembly 220-1 (e.g., may be located inside second coupling 224-2 of hose assembly 220-1). The sensor data, generated by the first sensor device 230-1 and/or the second sensor device 230-2, may be provided to controller 160. Controller 160 may use the sensor data, generated by the first sensor device 230-1 and/or the second sensor device 230-2, to determine whether the tracer material has been detected in the hydraulic fluid transported by hose assembly 220-1.

A third sensor device 230-3 may be located adjacent to first coupling 222-2 of hose assembly 220-2 (e.g., located inside outlet valve 214). A fourth sensor device 230-4 may be located adjacent to second coupling 224-2 of hose assembly 220-2 (e.g., located inside second coupling 224-2 of hose assembly 220-2). The sensor data, generated by the third sensor device 230-3 and/or the fourth sensor device 230-4, may be provided to controller 160. Controller 160 may use the sensor data, generated by the third sensor device 230-3 and/or the fourth sensor device 230-4, to determine whether the tracer material has been detected in the hydraulic fluid transported by hose assembly 220-2.

In some examples, controller 160 may determine a difference between the concentration of the tracer material (e.g., as detected by the first sensor device 230-1) when the hydraulic fluid is received at inlet valve 212 and the concentration of the tracer material (e.g., as detected by the second sensor device 230-2) prior to the hydraulic fluid being provided to hydraulic cylinder assemblies 180. Based on the difference, controller 160 may determine whether hose assembly 220-1 is experiencing a failure and may cause an action to be performed, in a manner similar to the manner described above.

In some examples, controller 160 may determine a difference between the concentration of the tracer material (e.g., as detected by the fourth sensor device 230-4) when the hydraulic fluid is received from hydraulic cylinder assemblies 180 and the concentration of the tracer material (e.g., as detected by the third sensor device 230-3) prior to the hydraulic fluid being provided to the one or more components external with respect to hydraulic circuit 170. Based on the difference, controller 160 may determine whether hose assembly 220-2 is experiencing a failure and may cause an action to be performed, in a manner similar to the manner described above.

Controller 160 may determine a difference between the concentration of the tracer material (e.g., as detected by the first sensor device 230-1) when the hydraulic fluid is received at inlet valve 212 and the concentration of the tracer material (e.g., as detected by the third sensor device 230-3) prior to the hydraulic fluid being provided to the one or more components external with respect to hydraulic circuit 170. Based on the difference, controller 160 may determine whether hose assembly 220-1 or hose assembly 220-2 is experiencing a failure and may cause an action to be performed, in a manner similar to the manner described above.

While the foregoing example has been described in connection with hose assembly 220 of hydraulic circuit 170, the present disclosure is applicable to a hose assembly used in other applications such as a fuel line hose, an engine oil hose, an engine coolant hose, an air hose, among other examples (e.g., other than a hose assembly used in a hydraulic circuit).

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of hydraulic circuit 170 may perform one or more functions described as being performed by another set of devices of hydraulic circuit 170.

Figure 3:
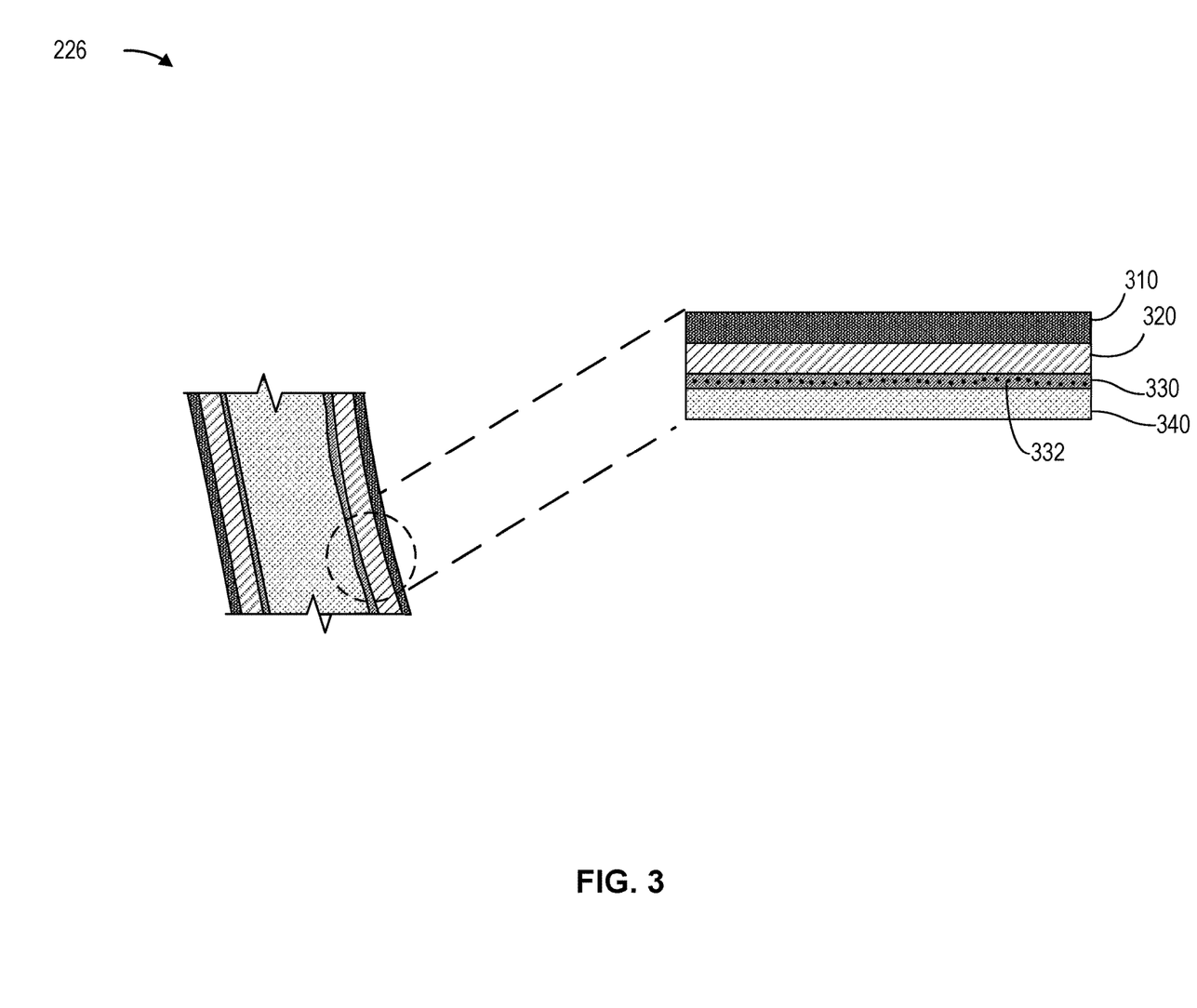
FIG. 3 is a diagram of an example cross-sectional view of an example hose described herein.

FIG. 3 is a diagram of an example cross-sectional view of an example hose 226 described herein. As shown in FIG. 3, hose 226 includes an outer layer 310, a first intermediate layer 320, a second intermediate layer 330, and an inner layer 340. Outer layer 310 may comprise a synthetic rubber material. The synthetic rubber material may be oil resistant, abrasion resistant, weather resistant, and/or temperature resistant. A thickness, of outer layer 310, may be from approximately 1 mm to approximately 1.8 mm.

First intermediate layer 320 may be adjacent to outer layer 310. In some situations, first intermediate layer 320 may contact outer layer 310. First intermediate layer 320 may comprise steel wire and/or textile wire. In some examples, first intermediate layer 320 may comprise one to four braids of high tensile steel wire. A diameter, of the steel wire, may be from approximately 0.8 mm to approximately 1 mm. Alternatively to first intermediate layer 320 comprising high tensile steel wire, first intermediate layer 320 may comprise four to eight spiral ply of high tensile steel wire. A diameter, of the steel wire, may be from approximately 0.2 mm to approximately 0.8 mm.

Second intermediate layer 330 may be adjacent to first intermediate layer 320. In some situations, second intermediate layer 330 may contact first intermediate layer 320. Second intermediate layer 330 may include a calendared rubber of synthetic rubber material. A width, of second intermediate layer 330, may be from approximately 40 mm to approximately 300 mm. A thickness, of second intermediate layer 330, may be from approximately from 0.3 mm to approximately 0.4 mm.

Second intermediate layer 330 may include a tracer material 332. Tracer material 332 may include a metal. For example, tracer material 332 may include cerium, yttrium, lanthanum, scandium, and/or zirconium. Tracer material 332 may be configured to be released into the hydraulic fluid when a portion of inner layer 340 experiences a failure, as explained in more detail below.

In some implementations, tracer material 332 may be embedded in second intermediate layer 330. Additionally, or alternatively, tracer material 332 may be sprayed on second intermediate layer 330. Additionally, or alternatively, tracer material 332 may be applied on the calendared rubber of synthetic rubber material that is wrapped on inner layer 340. Additionally, or alternatively, tracer material 332 may be sprayed on inner layer 340. Additionally, or alternatively, tracer material 332 may be sprayed on a fabric that is wrapped around inner layer 340.

Inner layer 340 may be adjacent to second intermediate layer 330. In some situations, inner layer 340 may contact second intermediate layer 330. Inner layer 340 may be configured to transport the hydraulic fluid. Inner layer 340 may comprise a synthetic rubber material. A thickness, of inner layer 340, may be from approximately 1 mm to approximately 2.8 mm.

In some implementations, hose 226 may include one or more additional layers. For example, hose 226 may include a third intermediate layer (not shown). In some situations, the third intermediate layer may be provided between outer layer 310 and second intermediate layer 330. The third intermediate layer may include a calendared rubber of synthetic rubber material. The third intermediate layer may be oil resistant, temperature resistant, and/or among other examples. A width of the third intermediate layer may be from approximately 40 mm to approximately 300 mm. A thickness of the third intermediate layer may be from approximately 0.3 mm to approximately 0.5 mm.

Hose 226 may include a fourth intermediate layer (not shown). The fourth intermediate layer may be provided with a rubber coating. In some situations, the fourth intermediate layer may be provided between outer layer 310 and second intermediate layer 330. A width, of the fourth intermediate layer, may be from approximately 40 mm to approximately 300 mm. A thickness, of the fourth intermediate layer, may be from approximately from 0.3 mm to approximately 0.4 mm.

While tracer material 332 has been described as including a metal, in some implementations, tracer material may include an ultraviolet (UV) dye. In such implementations, sensor device 230 may be include one or more devices configured to detect the UV dye. For example, sensor device 230 may include one or more devices with x-ray fluorescence capability.

The number and arrangement of layers shown in FIG. 3 are provided as an example. In practice, there may be additional layers, fewer layers, different layers, or differently arranged layers than those shown in FIG. 3. Furthermore, two or more layers shown in FIG. 3 may be implemented within a single layer, or a single layer shown in FIG. 3 may be implemented as multiple layers.

Figure 4:
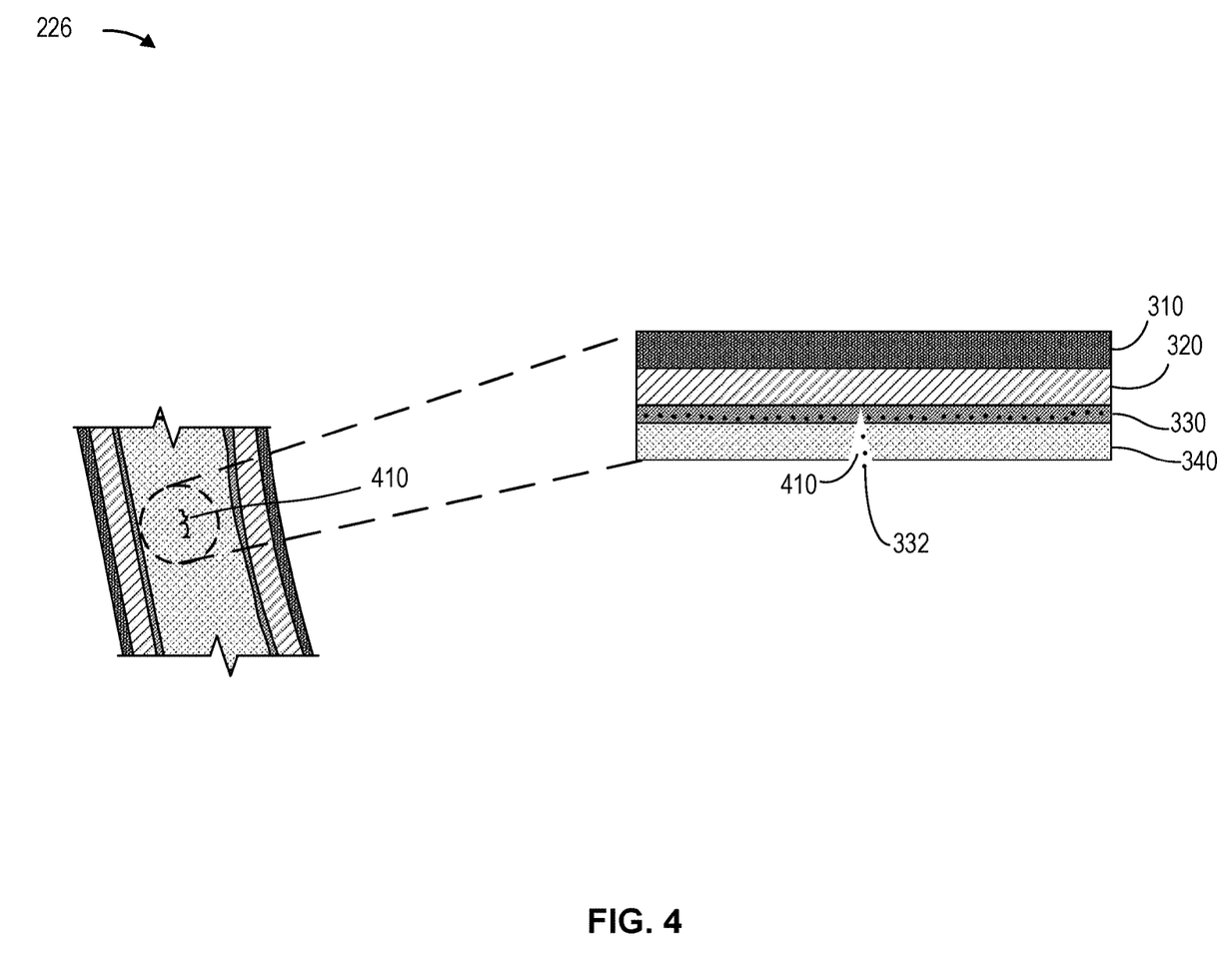
FIG. 4 is a diagram of an example cross-sectional view of an example hose described herein.

FIG. 4 is a diagram of an example cross-sectional view of an example hose 226 described herein. The elements of hose 226 have been described above in connection with FIG. 3. As shown in FIG. 4, hose 220 is experiencing a failure. For example, inner layer 340 includes a perforation 410. As a result of perforation 410 in inner layer 340, tracer material 332 may be released into the hydraulic fluid. For example, as a result of perforation 410 in inner layer 340, the hydraulic fluid may leak to and contact second intermediate layer 330, which includes tracer material 332. As a result of the hydraulic fluid leaking to and contacting second intermediate layer 330, tracer material 332 may be released into the hydraulic fluid.

As explained above, tracer material 332 may be detected by sensor device 230. Sensor device 230 may generate sensor data indicating that tracer material 332 has been detected and may provide the sensor data to controller 160. Controller 160 may determine that hose 226 is experiencing the failure based on the sensor data (e.g., based on the sensor data indicating that tracer material 332 has been detected) and may cause an action to be performed based on determining that hose 226 is experiencing the failure, as described above.

The number and arrangement of layers shown in FIG. 4 are provided as an example. In practice, there may be additional layers, fewer layers, different layers, or differently arranged layers than those shown in FIG. 4. Furthermore, two or more layers shown in FIG. 4 may be implemented within a single layer, or a single layer shown in FIG. 4 may be implemented as multiple layers.

INDUSTRIAL APPLICABILITY

The present disclosure relates to a hose comprising a plurality of layers including an outer layer, a first intermediate layer, a second intermediate layer comprising a tracer material, and an inner layer that is configured to transport a hydraulic fluid of a hydraulic circuit of a machine. The tracer material may be configured to be released into the hydraulic fluid when a portion of the inner layer experiences a failure, such as a perforation in the inner layer that may enable the hydraulic fluid to leak to other layers of the hose.

The hose assembly may be included in a system that includes a sensor device and a controller. The sensor device may be configured to detect the tracer material in the hydraulic fluid, and generate sensor data indicating that the tracer material has been detected. The controller may be configured to determine that the hose assembly is experiencing the failure based on the sensor data and cause an action to be performed based on determining that the hose assembly is experiencing the failure. For example, based on determining that the hose assembly is experiencing the failure, the controller may provide a notification (e.g., including information identifying the hose assembly, information identifying the hydraulic circuit, among other examples). The notification may be provided to cause the hose assembly to be repaired and/or replaced. Additionally, or alternatively, to providing the notification, the controller may cause a supply of the hydraulic fluid, to the hydraulic circuit, to be terminated.

In this regard, the system may enable the failure of the hose assembly to be detected and enable an appropriate action to be performed in a manner that prevents the hydraulic fluid from leaking to one or more other layers of the hose. A leak, of the hydraulic fluid, into the one or more other layers of the hose may cause damage to the hose assembly, damage to the hydraulic machine, and/or damage to the machine. Accordingly, based on the appropriate action, the system may prevent damage to the hydraulic circuit and/or damage to the machine. Therefore, the tracer material and the system may prevent an unintended operation of the machine and/or prevent a failure of the machine.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A system, comprising:
    a hose assembly configured to be connected to a hydraulic circuit of a machine,
        wherein a first layer, of a hose of the hose assembly, is configured to transport a hydraulic fluid,
        wherein a second layer, of the hose, comprises a tracer material that is configured to be released into the hydraulic fluid when the first layer is experiencing a failure;
    a sensor device configured to:
        detect the tracer material in the hydraulic fluid, and
        generate sensor data indicating that the tracer material has been detected; and
    a controller configured to:
        determine that the hose assembly is experiencing the failure based on the sensor data; and
        cause an action to be performed based on determining that the hose assembly is experiencing the failure.

2. The system of claim 1, wherein the controller, to cause the action to be performed, is further configured to at least one of:
    provide information identifying the hose assembly, or
    provide information identifying the hydraulic circuit or a group of components associated with the hydraulic circuit.

3. The system of claim 1, wherein the controller is further configured to:
    cause a supply of the hydraulic fluid, to the hydraulic circuit, to be terminated based on determining that the hose assembly is experiencing the failure.

4. The system of claim 3, wherein the controller, to cause the supply to be terminated, is further configured to:

determine whether a concentration of the tracer material, in the hydraulic fluid, satisfies a threshold; and cause the supply of the hydraulic fluid, to the hydraulic circuit, to be terminated when the concentration of the tracer material satisfies the threshold.

5. The system of claim 1, wherein the first layer is adjacent to and contacts the second layer;

wherein the first layer comprises a synthetic rubber material; and wherein the second layer comprises a calendared rubber of synthetic rubber embedded with the tracer material.

6. The system of claim 1, wherein the tracer material comprises a metal.

7. The system of claim 1, wherein the tracer material comprises at least one of cerium, yttrium, lanthanum, scandium, or zirconium.

8. A hose assembly, comprising:

a hose comprising:

an outer layer, a first intermediate layer adjacent to the outer layer, a second intermediate layer adjacent to the first intermediate layer, and an inner layer adjacent to the second intermediate layer, wherein the inner layer is configured to transport a hydraulic fluid of a hydraulic circuit of a machine, wherein the second intermediate layer comprises a tracer material, wherein the tracer material is configured to be released into the hydraulic fluid when a portion of the inner layer experiences a failure, wherein the tracer material comprises at least one of cerium, yttrium, lanthanum, scandium, or zirconium.

9. The hose assembly of claim 8, wherein the tracer material comprises a metal material.

10. The hose assembly of claim 8, wherein the inner layer comprises a synthetic rubber material; and wherein the outer layer comprises a synthetic rubber material.

11. The hose assembly of claim 8, wherein the first intermediate layer comprises at least one of steel wire or textile wire; and wherein the second intermediate layer comprises a synthetic rubber material.

12. The hose assembly of claim 11, wherein a thickness of the inner layer is from approximately 1 mm to approximately 2.8 mm;

wherein a diameter of the steel wire is from approximately 0.8 mm to approximately 1 mm;

wherein a thickness of the second intermediate layer is from approximately 0.3 mm to approximately 0.4 mm; and wherein a thickness of the outer layer is from approximately 1 mm to approximately 1.8 mm.

13. A hose assembly, comprising:

a hose comprising:

a first layer configured to transport a fluid; and a second layer comprising a tracer material that is configured to be released into the fluid when the first layer is experiencing a failure, wherein the tracer material comprises at least one of cerium, yttrium, lanthanum, scandium, zirconium, or an ultraviolet dye.

14. The hose assembly of claim 13, wherein the tracer material comprises a metal material.

15. The hose assembly of claim 13, wherein the first layer comprises a synthetic rubber material; and wherein the second layer comprises a synthetic rubber material.

16. The hose assembly of claim 13, wherein the hose further comprises a third layer; and wherein the third layer comprises steel wire or textile wire.

17. The hose assembly of claim 16, wherein a diameter of the steel wire is from approximately 0.8 mm to approximately 1 mm.

18. The hose assembly of claim 13, wherein a thickness of the first layer is from approximately 1 mm to approximately 2.8 mm; and wherein a thickness of the second layer is from approximately 0.3 mm to approximately 0.4 mm.

* * * * *